Patented July 9, 1935

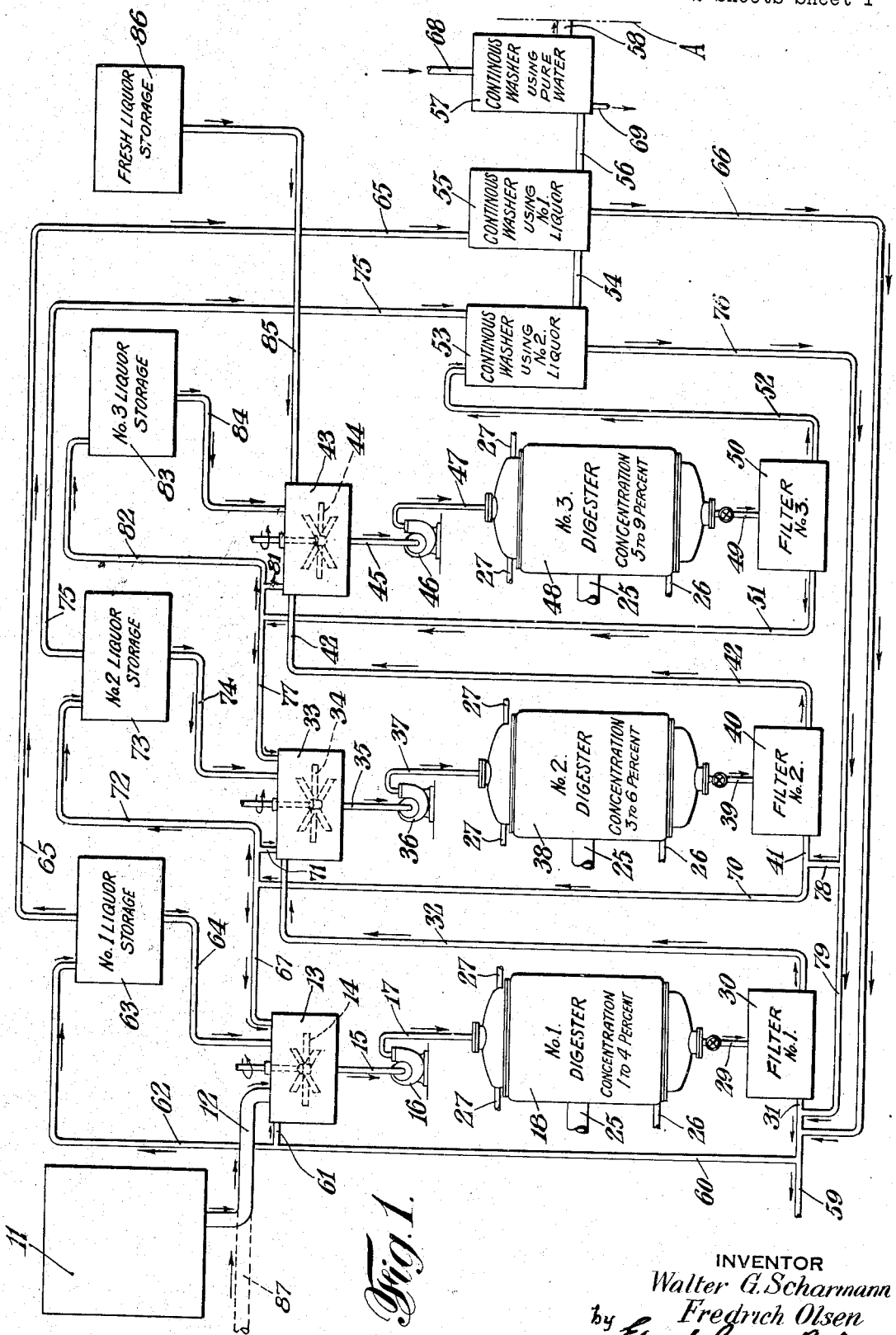

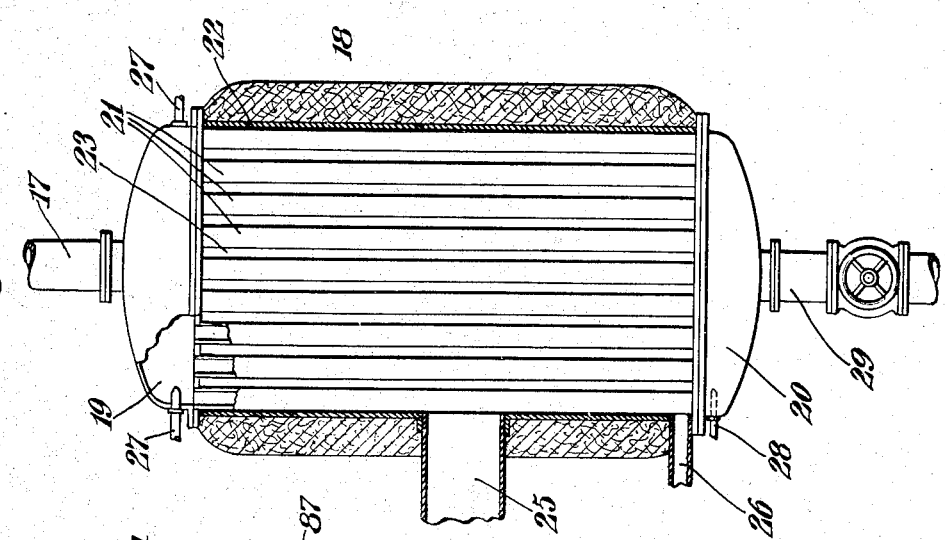
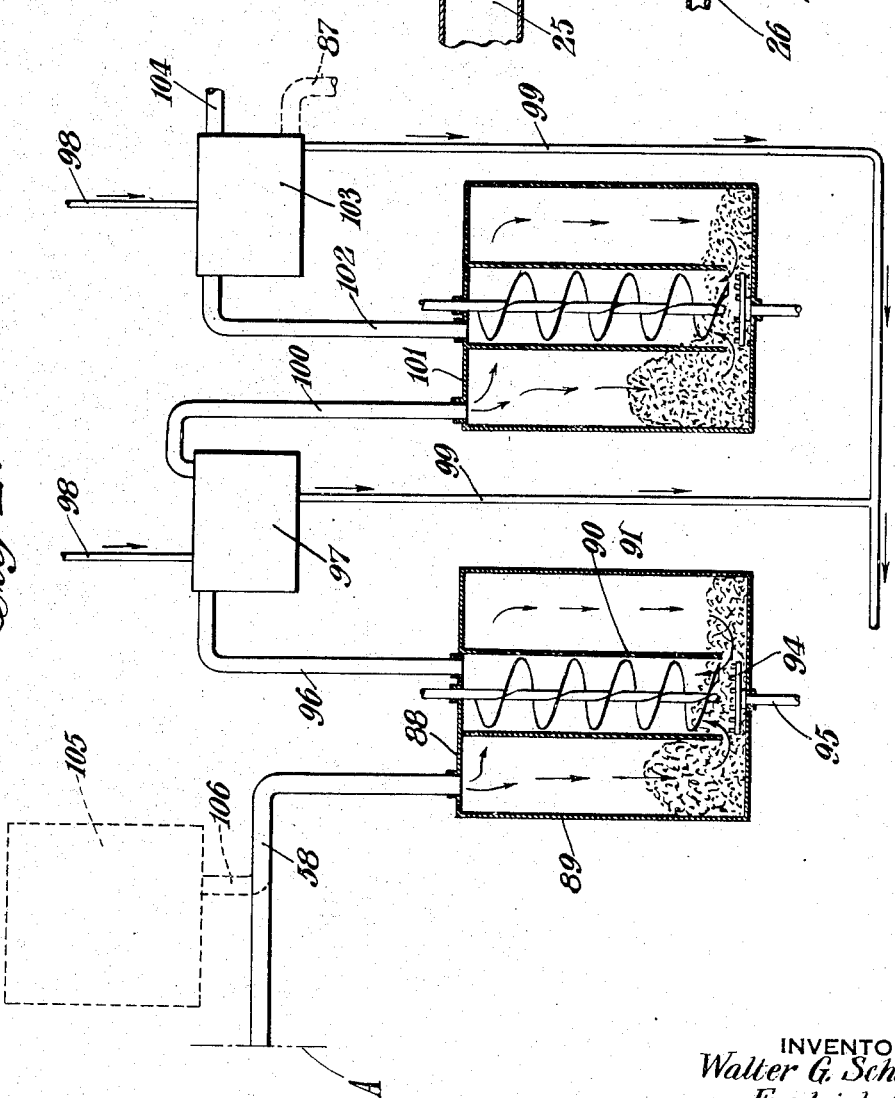

2,007,348

UNITED STATES PATENT OFFICE 2,007,348

PROCESS AND APPARATUS FOR DELIGNIFICATION

Walter G. Scharmann, Bassett Park, Mine Hill, N. J., and Fredrich Olsen, Alton, Ill., assignors, by direct and mesne assignments, to The Cellulose Research Corporation, a corporation of Delaware Application October 23, 1929, Serial No. 401,749
Renewed January 23, 1934

21 Claims. (Cl. 92—9)

This invention relates to a process of and apparatus for the production of pulp or cellulose from woody material for the paper, chemical and rayon industries. The essential constituent of woody material which is useful for such purposes is the portion which is in the form of elongated cellular structures or fibers composed largely of cellulose. These fibers also have associated therewith a considerable quantity of lignin which should be separated from the cellulose. There may also be resins, sugars, tannins and other undesirable materials in much smaller quantities but it is chiefly the lignin which offers the greatest problem not only from its greater quantity but from the nature of its intimate association with the cellulose which it is desired to retain.

Woody material referred to herein may be defined as being preferably clean chips of wood from coniferous or deciduous trees from which the bark has been removed when high grade pulps are required, but from which complete removal of the bark is not necessary if lower grades of pulp are being prepared.

Woody material also comprises portions of the stems of plants for flax straw from which the bark and bast fibers have been removed; corn stalks, wheat straw and bamboo, these forms of vegetation being cut into convenient lengths for handling in the apparatus described.

The usual process for producing cellulose or pulp from wood involves as a preliminary step the mechanical separation of the wood into relatively small pieces or chips. The wood in the form of chips is then treated chemically to remove the lignin and other materials, the precise treatment depending somewhat on the nature of the wood and somewhat on the use to which the resulting product is to be put and the consequent requisites of purity, color, cost, etc.

The methods of manufacturing pulp or cellulose from wood, as heretofore practiced, outlined very generally in the preceding paragraph, are subject to a number of limitations which have existed so long in the industry that they have come to be considered as inevitable. One of these limitations is the time necessarily required for the chemicals to reach and affect the innermost portions as well as the outer portions of the chips. While processes and conditions vary and any generalization is apt to be inaccurate in specific cases, yet it may be stated with a fair degree of accuracy that the time involved runs into several hours. This factor of time has contributed largely in preventing the use of any continuous process although such a process has been greatly desired. Another undesirable feature which is closely associated with the considerable time required arises from the fact that the chemicals employed are not completely selective. That is, the chemical attacks the lignin more than it does the cellulose but as the chemical works farther into the structure of the chips it becomes somewhat impoverished and works more slowly while the chemical at the surface remains at full strength and because of the long time involved eventually degrades a considerable portion of the cellulose which under conditions of prompt chemical action would be retained in its pure cellulose form and would be utilized.

The obvious suggestion of grinding the wood into smaller chips before subjecting it to the chemical process is open to two serious objections. The first is the less serious of the two and is simply that the additional cost of grinding the chips still finer is possibly greater than the value of the extra time and the cellulose lost by degradation. The other objection relates to the preservation of the itegrity of the individual fibers. Any process for mechanically separating the wood which has been heretofore used which is carried sufficiently far to substantially separate the wood into its constituent fibers also ruptures the fibers themselves to a very considerable degree and it is upon the strength of the individual fibers that the strength of the resulting paper very largely depends.

It is common practice in pulp mills to sieve chips in order to remove fine chips, and the introduction of sawdust is avoided partly because the apparatus is unsuited for handling finely divided material and partly because sawdust contains so many fibers which has been partially reduced in length that they are considered to small for appropriate use in paper making.

As distinguished from the foregoing, the present invention relates to the use of woody material in a form wherein the fibers have been substantially separated from each other or into small bundles of fibers or both, and which exists as a moss-like substance thoroughly open and accessible to the action of the chemicals employed.

This material is preferably formed by internal disintegrating means such as by confining chips in a closed vessel and subjecting them to water and/or other liquid under high pressure and temperature and then suddenly releasing the pressure whereby the water in the interstices between the fibers is suddenly formed into steam or gas and the fibers are torn apart but with very little rupture of the fibers themselves. But whether the foregoing or some other process is employed, it is essential that the woody material should be substantially separated into its constituent fibers or into small bundles or fibers or both. Closely inter-related with the advantages obtained by means of the invention is the manner in which the lignin is associated with the cellulose in the cell structure or fiber. The lignin acts very much as though it were encrusted on the surface of the fiber and as though it did not penetrate very deeply therein. Therefore a fiber, the surface of which is wholly exposed to the action of the chemicals, has its lignin very quickly and very promptly dissolved and there is relatively little change in the cellulose of the fiber. On the other hand a large bundle of fibers, as for example, a chip, which only exposes a portion of the surfaces of its fibers directly to the action of the chemicals is very slowly acted upon in the interior portions as the chemicals pass very slowly into the interior and become weaker in so doing, and meanwhile the outer portions have the cellulose somewhat degraded. It should be emphasized that the uncovering and exposure of the surfaces of the fibers to the delignification processes is far more than merely making finer chips but it is primarily a recognition and utilization of the fact that delignification is essentially a treatment of the fiber surfaces rather than of the interiors of the fibers, and any preliminary treatment which stops short of substantially complete fiber separation and/or the reduction of the wood to relatively small bundles in which the individual fibers remain substantially unbroken, is essentially different.

Another resulting advantage is the possibility of employing a continuous process instead of the batch process. The chief contributing factor to this result is the enormously reduced time required for the chemicals to be in contact with the moss-like substance. A second contributing factor is the very small subdivision of material, far smaller than the chips ordinarily used, whereby the material is more readily carried in suspension in a liquid medium and whereby it may be readily transported from one piece of apparatus to another.

The objects of the invention may be summarized as being to produce more quickly and more cheaply pulp or cellulose from wood; to accomplish the delignification of the wood with a maximum yield and a minimum amount of degradation of the cellulose; and to carry out the foregoing with apparatus adapted for a continuous process.

In order to more clearly explain the invention, reference is made to the following description of one form of apparatus suitable for carrying out the processes involved, in which Fig. 1 is a more or less diagrammatical view of cooking apparatus adapted to treat the separated fibers for the purpose of delignification;

Fig. 2 shows additional apparatus for chlorination of the separated fibers or of the material after it has passed through the apparatus shown in Fig. 1; and Fig. 3 is a vertical view partly in section and partly broken away showing more in detail the construction of one of the digesters of Fig. 1.

Reference character 11 indicates diagrammatically apparatus suitable for making wood moss or wood in such a degree of subdivision that the fibers are substantially separated from each other and/or which have been reduced to relatively small bundles in which the individual fibers remain substantially unbroken. This apparatus preferably comprises a container which may be a large autoclave of standard make in which there may be placed wood chips and into which there may be introduced steam at high temperature and pressure. The chips first receive a preliminary period of soaking to permit the water to enter thoroughly into the interstices between the individual fibers. The pressure is then suddenly released and the water entrapped within the chips flashes quickly into steam disrupting the chips and separating the wood into fibers and/or small bundles of fibers and there is formed a moss-like substance ideally adapted for the subsequent treatment to be hereinafter described. Not only does the preliminary period of soaking permit the water to enter into the wood, but it also seems to soften the material which binds the fibers together and thus to prepare them for the subsequent separation. When the moss-like material or separated fibers are to be given a subsequent cooking treatment, such as that to be presently described, it is sometimes desirable to use a solution of the same chemical as that to be later used, as the fibers seem to be more thoroughly prepared for such subsequent treatment in this manner. While water has been mentioned as a fluid which is used for impregnating the chips of wood, it is to be understood that other fluids, such as benzene, alcohol and acetone or aqueous solutions of salts and/or caustic soda or other reagents may be used.

The autoclave treatment may vary with the quality and quantity of wood chips and also with the fluid medium used. The treatment of the chips under pressure allows the liquid fluid to impregnate the innermost parts of the wood in such a manner that the fiber sheaths are affected causing the fibers to be loosened from each other without materially injuring these fibers so as to rip or tear them. The longer the pressure treatment of these chips in the autoclave the more the fluid medium penetrates the sheaths, thereby resulting in well separated fibers.

The moss-like material from the apparatus 11 is transported to a headbox 13. The headbox 13 is also supplied with a chemical adapted for the delignification of the fibrous material. This may be similar to any of the liquors commonly used for the delignification of wood chips and for converting them into paper pulp, such as are used in the sulphite or the soda process. The chemical used by way of example in the present description is caustic soda. The headbox 13 is preferably provided with an agitator 14 for thoroughly mixing the mossy material and the liquor. A pipe 15 carries the combined fibrous material and liquor to a pump 16, preferably of the centrifugal type, and from the pump a pipe 17 carries the material to a digester indicated generally by the reference character 18.

The digester 18 is preferably of a continuous flow type and the detailed construction of one form of such a digester is shown in Fig. 3. The shape of the digester is approximately that of a vertically disposed cylinder.

A chamber 19 is provided at the upper end of the digester and a similar chamber 20 at the lower end thereof. Between the upper chamber 19 and the lower chamber 20 there extends a plurality of vertically disposed tubes 21. Surrounding the tubes 21 and extending from the upper chamber 19 to the lower chamber 20 there is provided a casing 22 which thus encloses a heating compartment 23. The exterior of the casing 22 is provided with an insulating jacket 24 in order to reduce the heat losses. A pipe 25 may be provided for the introduction of steam or other heating medium into the compartment 23 and a similar pipe 26 may be provided for carrying away the condensate. One or more steam injectors 27 may be provided at the upper chamber preferably positioned so as to discharge the steam tangentially into the chamber 19, thus not only heating the combined mossy material and liquor but still further agitating it and mixing it. The material being treated passes from the upper chamber 19 through the tubes 21 into the lower chamber 20 and out through a discharge pipe 29. There may be provided as indicated at 28 a thermometer well with which may be associated a continuous recorder not shown. As already stated, caustic soda is the chemical which has been selected by way of example to illustrate the invention. The strength of the solution in this digester may be from 1 to 4 per cent. and the pressure may be from 150 to 250 pounds per square inch with the corresponding solution temperature. While these specific figures are given by way of illustration, it is to be understood that they are capable of considerable variation to suit various conditions and are not intended to be limiting in any way except in accordance with the restrictions set forth in the accompanying claims.

The pipe 29 discharges into a continuous filter 30 which is designated on the drawings as filter No. 1. The liquor with the dissolved substances passes out through a pipe 31 while the insoluble portion of the moss-like material is transported through pipe 32 into a second headbox 33 having an agitator 34. This headbox is also supplied with a liquor as will be more fully described, which is somewhat stronger than the liquor employed for the previous part of the process. The fibers and liquor after being thoroughly mixed pass through a pipe 35, pump 36 and pipe 37 into a second digester 38. The strength of the caustic soda solution in this digester may be from 3 to 6 per cent. and the pressure may be from 100 to 150 pounds per square inch. After the treated material leaves the digester 38, it passes through a pipe 39 into a continuous filter 40 which is called filter No. 2. The liquor and dissolved substances pass out through a pipe 41 and the insoluble cellulose is transported through pipe 42 into a headbox 43 having an agitator 44. This headbox is supplied with liquor which is somewhat stronger than that supplied to either of the two previous headboxes and after being thoroughly mixed with the fibers is carried through a pipe 45, a pump 46 and another pipe 47 into a third digester 48. The strength of the caustic soda solution in this third digester 48 may be from 5 to 9 per cent. and the pressure may be from 75 to 125 pounds per square inch. After leaving the digester 48, the mixture passes through a pipe 49 to a continuous filter 50 which is designated on the drawings as filter No. 3. The liquor and dissolved substances pass out through a pipe 51 while the fibers or insoluble cellulose is carried through pipe 52 to a washer 53, preferably of the continuous type.

The actual number of digesters may in fact be more or less than the number shown and is dictated by an economic balance of operating conditions such as type of wood, temperature, pressure, solution concentration versus the equipment cost, capacity, and grade of cellulose produced (whether highly delignified or not). The description and accompanying drawings are to be considered for purposes of explanation and illustration only.

As shown in the drawings, there are provided a plurality of such continuous washers. After receiving a certain amount of washing in the washer 53, the material is carried to a second washer 55 and from the second washer it is carried to a washer 57. The material leaves the washer 57 through pipe 58 and may be further treated in the apparatus shown in Fig. 2, as will be presently described.

The actual number of washers may be more or less than the number shown. The description and accompanying drawings are to be considered for purposes of explanation and illustration only.

The liquor discharged from filter No. 1 through the pipe 31 may be carried through a pipe 59 to an incinerator not shown, or it may be carried through a pipe 60 for use over again. In practice, it is generally desirable to divide the liquor discharged through the pipe 31, a portion going through the pipe 59 to the incinerator and a portion going through the pipe 60 for re-use. The liquor passing through the pipe 60 may be carried through a pipe 61 directly to the headbox 13, or it may be carried through a pipe 62 to a receptacle 63 designated on the drawings as No. 1 liquor storage.

A pipe 64 is provided for carrying the liquor from the storage 63 to the headbox 13. This liquor being the weakest is used for washing the digested cellulose in the last washer prior to the one using pure water. A pipe 65 carries the No. 1 liquor to the washer 55 and a pipe 66 carries it therefrom to the pipe 31. The liquor is thereby somewhat replenished in strength. A pipe 64 is also provided for introducing makeup liquor to the headbox 13.

The washer 57 is provided with a pipe 68 for the introduction of pure water and a pipe 69 is also provided for carrying away the discharged water and waste material.

In a similar manner the discharged liquor from filter No. 2 passes through the pipe 41 and is carried through a pipe 70 from which a certain portion may be drawn off through the pipe 67 to supply make-up liquor for No. 1 digester as already described. The remaining portion of the liquor flowing through the pipe 70 may be returned directly to the headbox 33 through a pipe 71 or it may be carried through a pipe 72 to a container 73, designated on the drawings as No. 2 liquor storage, and is thence carried to the headbox 33 through a pipe 74. No. 2 liquor is used for washing the digested material passing through the first washer, a pipe 75 being used for carrying the liquor to the washer and pipe 76 being used to carry the liquor away from the washer 53. The liquor passing through the pipe 76 which has been enriched by the washing operation may be carried by means of a pipe 78 to the pipe 41 of filter No. 2 or it may be carried through a pipe 79 to the pipe 31 of filter No. 1. The headbox 32 is supplied by a pipe 77 which furnishes makeup liquor.

The pipe 51 which carries the discharged liquor from filter No. 3 is connected with the pipe 77 whereby a portion of its liquor is used for furnishing the makeup liquor passing on to headbox 33. The pipe 51 is also connected with a pipe 81 for returning the used liquor to the headbox 43 and is also connected to a pipe 82 which is connected with a container 83, designated on the drawings as No. 3 liquor storage. A pipe 84 is connected with the container 83 and the headbox 43. The headbox 43 is also supplied through a pipe 85 from a container 86 designated as fresh liquor storage.

While the drawings indicate an arrangement whereby the material after passing through the foregoing apparatus may then be carried to a chlorination apparatus, it is also possible to first partially delignify the raw material by means of the chlorination process and then carry it through the cooking apparatus already described. A pipe indicated as 87 may be used for supplying such partially delignified material in conjunction with the material supplied from the apparatus 11, or in place thereof.

Referring to Fig. 2, the material from the digesters and washers is carried to a chlorination unit or tower 88. This may comprise an outer substantially cylindrical casing 89 disposed with its axis vertical and within which there is positioned a second cylindrical casing 90. Within the second casing 90 there may be positioned a screw conveyor 91 having a shaft 92 extending upwardly through the upper wall of the unit and having a pulley 93 secured thereto for rotating the shaft. A header 94 may be provided at the end of a pipe 95 for carrying chlorine into the tower 88. The chlorinated fibrous material passes from the upper portion of the chlorination unit to a continuous washer 97.

A washing solution which may be a weak solution of caustic soda or bisulphite of soda is supplied through a pipe 98 and the discharged washing solution may be carried away by means of a pipe 99. The washed fibrous material is carried to a second chlorination unit 101 and thence to a washer 103, and finally the finished material is discharged through a pipe 104 fully delignified and bleached.

It is to be understood that the chlorination process may, if desired, precede the cooking process. Apparatus for producing the moss-like fibers, as indicated at 105, may be connected through a pipe 106 to the pipe 58 and the material discharged from the last washer 103 may be carried to the cooking apparatus shown in Fig. 1. It may also be desirable to alternate the digesters or cooking units with the chlorination units; that is, in Fig. 2 the washer 97 might be replaced by a digester and a washer.

In operation, the material prepared as already described is carried from the apparatus 11 through the pipe 12, headbox 13, pipe 15, pump 16 and pipe 17 to the digester 18. The digested material passes through the pipe 29 to the filter 30 from which the insoluble fibers are carried to the headbox 33. From the headbox 33 to which a still stronger solution of soda has been admitted the material is carried through the pipe 35, pump 36 and pipe 37 to the second digester 38. The discharged material passes through the pipe 39 to the filter 40. The insoluble portion of the fibers is carried to the headbox 43 to which there is supplied a still stronger solution of caustic soda.

This material passes through a pipe 45, pump 46 and pipe 47 to the third digester 48. The discharged material is carried through the pipe 49 to the filter 50. The insoluble portion of the material is carried to the washer 53, then to the washer 55, and finally to the washer 57.

The fibers which have been partially delignified are carried with approximately 100 per cent. moisture content to the top of the chlorination unit 88 and after dropping to the bottom of this unit are carried by the screw conveyor 91 to the top of the inner cylinder and introduced to the washer 97. At the same time chlorine gas is admitted at the lower portion of the chlorination unit. The action of the chlorine is a double one. One action of the chlorine is to form, it is supposed, lignin chloride on the surface of the fibers which is insoluble and therefore prevents further action on the interior of the fibers. In other words, the delignification action of chlorine is essentially a surface process and it is necessary to wash away the insoluble lignin chloride before additional chemical action can take place. With the size of chips usually employed, the number of repeated washings and chlorination processes is so great as to render the method of delignification of wood chips by chlorine entirely impractical. With the very fine subdivision of the wood employed herein so that the fibers are separated from each other, or reduced to relatively small bundles in which the individual fibers remain substantially unbroken, the chlorination becomes practical. Inasmuch as the manufacture of soda and chlorine are commonly carried out together, the use of soda or sulphate digesters with the chlorination units is considered preferable but it is to be understood that bi-sulphite digesters may be used or the digesters may be dispensed with altogether.

The second action of the chlorine is a bleaching action so that the material discharged from the last washer 103 is completely delignified and bleached to the desired degree.

While the foregoing description is particularly applicable to the apparatus shown for a continuous process, it is to be understood that many of the advantages of the invention are also present when the batch method is employed. It is thought, however, that there are additional advantages to be derived wherever it is feasible to employ the continuous processes and the new relationships which make continuous processes an accomplished fact are considered to be important features of the invention. One of the contributing factors which makes the continuous process applicable is the greatly reduced time necessary for substantially completing the chemical reactions so that the size of the apparatus is kept within reasonable bounds. Another contributing factor is the fine subdivision of the wood which enables the fibers to be carried in a state of suspension in the liquor and to be readily pumped continuously with little difficulty.

By the way of summary, attention is directed to the fact that there are certain advantages to be found in the cooking process when employed without the chlorination process; that there are certain advantages to be found in the chlorination process when employed without the cooking process; and there are still further advantages inherent in the combined use of the cooking process and the chlorination process.

To more clearly distinguish between the present invention and the usual treatment in a modern batch digester such usual treatment may be briefly summarized. Under the action of heat and pressure the digesting chemicals first attack the outside portions of the chip and then gradually penetrate to the interior. In so doing the digesting liquors tend to become weaker and consequently the rate at which the reaction proceeds becomes slower. During all of this time the outside portion of the chip not only has had the first introduction to the digesting liquor but is also continually in contact with the strong liquors making up the main body of the solution. Consequently, by the time the interior of the chip has received the desirable amount of treatment, the outside has possibly been overtreated. This effect goes hand in hand with lower and more degraded cellulose yields. As distinguished from the foregoing, the present invention employs wood wherein the fibers have been substantially completely separated from each other, or reduced to relatively small bundles in which the individual fibers remain substantially unbroken. The lignins seem to reside in or at, or near the surface of the individual fibers and when such fibrous surfaces are exposed to the action of the chemical, the process is very rapid and effectual. Because of the very considerable shortening of the time the degradation of the cellulose is much less. There is, nevertheless, some degradation of the cellulose, particularly in attempting to complete the delignification by means of the cooking process. On the other hand the alkali attacks the beta cellulose and gamma cellulose so that the resulting product has a very high alpha cellulose content.

The peculiar advantages derived from the use of separated fibrous material with a chlorination process are somewhat different. The chlorination process seems to be essentially a surface action and it is supposed that lignin chloride, which is insoluble, is formed at the surface of the small pieces of wood, whether they are chips or fibers. This lignin chloride film slows up and practically stops further action unless the lignin chloride coating is washed away. Such repeated washings are prohibitive in time and cost with the size of chips ordinarily employed. The fine subdivision of the wood into fibers substantially separated from each other and reduced to relatively small bundles, gives the chlorine an opportunity of reaching substantially all the lignins at once and with a few intermediate washings the entire delignification process may be completed. Unlike the alkali, chlorine has little effect on the beta and gamma cellulose. The chlorination process may therefore be used alone when the presence of beta and gamma cellulose in the resulting product is not a serious objection as, for example, for use as pulp in paper-making. The chlorination process is also partially a bleaching process. It is true that the chlorination action is more selective than the cooking process, there being very little degradation as the chlorine acts almost exclusively on lignins and but very little in the way of degradation of the cellulose, if its action is limited with respect to time and temperature. There are also similar advantages in the use of wood in the mossy form in connection with other gaseous agents than chlorine for example, $SO_2$.

From the foregoing, it may be readily seen that it is possible by combining the cooking process with the chlorination process to obtain results impossible of attainment with either alone. For example, the alkali in addition to its delignifying action may be relied upon for eliminating the beta and gamma cellulose and the chlorination may be used for assisting in the delignification which if accomplished by cooking alone would result in an excessive amount of degradation. A further advantage of the combined process is the economic saving in utilizing the soda and the chlorine which are commonly manufactured together, one being a by-product of the other.

It is to be understood that the foregoing description of the invention is illustrative and that various changes may be made without departing from the spirit and scope of the invention as defined in the subjoined claims.

We claim:

1. A process of delignifying wood comprising continuously passing wood in a moss-like condition in which the fibers have been substantially separated from each other, or reduced to relatively small bundles in which the individual fibers remain substantially unbroken, through closed digesters in one direction and continuously passing liquors under high temperature and pressure for delignifying said fibers through said digesters in the opposite direction so that the liquor from each subsequent digester is reintroduced into the previous digester.

2. Apparatus for the delignification of wood comprising a plurality of continuous flow digesters, means for passing wood in a moss-like condition in which the fibers have been substantially separated from each other, or reduced to relatively small bundles in which the individual fibers remain substantially unbroken, successively through said digesters, means for cooking said moss-like material with a delignifying liquor in successively greater strength in each digester, a plurality of continuous flow washers, and means for passing said delignified fibers successively through said washers, the circulating liquor of each digester except the last being used for the washing liquor in one of the washers.

3. A digester for the delignification of wood in the form of a moss-like substance in which the fibers have been substantially separated from each other, or reduced to relatively small bundles in which the individual fibers remain substantially unbroken, comprising a closed chamber at each end of said digester, a plurality of tubes connecting said chambers, means for continuously supplying the moss-like fibers and the cooking liquor to one of said chambers and for passing said fibers and liquor through the tubes into the other chamber, a casing around said tubes, and means for supplying a heating medium to the interior of said casing and around said tubes.

4. A process of delignifying wood comprising subjecting wood in chip form to liquid impregnation, heat and pressure and sudden release of pressure to reduce the fibres to a moss-like condition in which the fibres have been substantially separated from each other or reduced to relatively small bundles in which the individual fibres remain substantially unbroken, continuously passing said fibres through a closed container and delignifying said fibres by subjecting said fibres in said container to treatment with chlorine.

5. A process of delignifying wood comprising subjecting wood in chip form to liquid impregnation, heat and pressure and sudden release of pressure to reduce the fibres to a moss-like condition in which the fibres have been substantially separated from each other or reduced to relatively small bundles in which the individual fibres remain substantially unbroken, continuously passing said fibres through a closed container and simultaneously delignifying said fibres by passing chlorine gas through said container and said moss-like substance.

6. A continuous process of delignifying wood comprising subjecting chips thereof to liquid impregnation, heat and pressure and sudden release of pressure to reduce the fibers to a moss-like condition in which the fibers are substantially separated or reduced to relatively small bundles in which the individual fibers remain substantially unbroken, continuously passing said moss-like substance through a treatment with a liquor adapted to dissolve lignins while having relatively less effect on the cellulose, reinforcing the strength of said liquor so as to prevent it from becoming impoverished and completing the separation of the dissolved lignins and the insoluble cellulose within less than two hours after the beginning of said liquor treatment in order to avoid degradation of the cellulose.

7. A continuous process of delignifying wood comprising forming it into suitable sized pieces, soaking said wood in a delignifying liquor to permit said liquor to enter thoroughly into the interstices between the individual fibers at a temperature below cooking, then further treating said wood under heat and pressure to cause said liquor to react with the lignin, and continuously carrying on a delignifying reaction with supply of fresh liquor thereto during the reaction to avoid impoverishment of the reacting chemicals, and continuing said treatment for not longer than two hours and until the wood has been delignified to desired degree.

8. A continuous process of delignifying wood comprising forming it into suitable sized pieces, soaking said wood in a delignifying liquor to permit said liquor to enter thoroughly into the interstices between the individual fibers, then separating the wood from the soaking liquor, then continuously feeding said separated wood and simultaneously subjecting the wood to heat and pressure to cause the retained liquor to react with the lignin and separate the cellulose fibers and then further treating the wood with delignifying liquor until the desired degree of delignification is attained.

9. A method of delignifying wood comprising continuously passing wood in disintegrated condition in which the fibers have been substantially separated from each other or reduced to relatively small bundles in which the individual fibers remain substantially unbroken successively through said digesters, and cooking said material with delignifying chemicals of successively greater strength in each successive digester.

10. A method of delignifying wood comprising continuously passing wood in disintegrated condition in which the fibers have been substantially separated from each other or reduced to relatively small bundles in which the individual fibers remain substantially unbroken successively through said digesters, and cooking said material with delignifying chemicals under a successively lower pressure and temperature in each successive digester.

11. A method of delignifying wood comprising continuously passing wood in disintegrated condition in which the fibers have been substantially separated from each other or reduced to relatively small bundles in which the individual fibers remain substantially unbroken successively through said digesters, and cooking said material with delignifying chemicals in successively greater strength and under a successively lower pressure and temperature in each successive digester.

12. A method of delignifying wood comprising continuously passing wood in disintegrated condition in which the fibers have been substantially separated from each other or reduced to relatively small bundles in which the individual fibers remain substantially unbroken successively through said digesters, and cooking said material with delignifying chemicals in successively greater strength in each digester and using the discharged liquor of a relatively greater strength from a succeeding digester for make-up for a preceding digester employing liquor of a relatively less strength.

13. A method of delignifying wood comprising dividing said wood into pieces suitable for treatment, subjecting said divided material to a delignifying action by chlorination, and subsequently cooking said material with other digesting liquor to complete the delignification.

14. A method of delignifying wood comprising dividing said wood into pieces suitable for treatment, subjecting said divided material to a delignifying action by chlorination, repeating said treatments, and subsequently cooking said material with other digesting liquors to complete the delignification.

15. A method of delignifying wood comprising dividing said wood into pieces suitable for treatment, subjecting said divided material to a delignifying action by chlorination, treating said material with a reducing agent, and subsequently cooking said material with other digesting liquors to complete the delignification.

16. A method of delignifying wood comprising dividing said wood into pieces suitable for treatment, subjecting said divided material to a delignifying action by chlorination, treating said material with a reducing agent, repeating said treatments, and subsequently cooking said material with other digesting liquors to complete the delignification.

17. Process for delignifying wood comprising supplying the wood as material in suitably sized units, feeding said material to digesting means, adding digesting liquor to said material at the entrance to said digesting means, continuously feeding said material while continuing the digesting reaction, separating the liquor from the digested pulp and separately discharging said liquor and said pulp.

18. Process for delignifying wood comprising supplying the wood as material in suitably sized units, feeding said material under pressure to digesting means, adding digesting liquor to said material at the entrance to said digesting means, continuously feeding said material while continuing the digesting reaction, separating the liquor from the digested pulp and separately discharging said liquor and said pulp.

19. Process for delignifying wood comprising supplying the wood as material in suitably sized units, feeding said material under pressure to digesting means, adding digesting liquor to said material at the entrance to said digesting means, continuously feeding said material while continuing the digesting reaction, separating the liquor from the digested pulp and washing said pulp to remove impurities before exposing said pulp to the atmosphere.

20. Apparatus for the chlorination of wood in the form of a moss-like substance in which the fibers have been substantially separated from each other, or reduced to relatively small bundles in which the individual fibers remain substantially unbroken, comprising a pair of substantially cylindrical vertically disposed casings positioned one within the other and having a passage between the outer casing and the inner casing at the bottom thereof, means for feeding said moss-like substance to said outer casing, a screw conveyor positioned within said inner casing, and means for introducing chlorine gas continuously to the interior of said casings.

21. A method of delignifying wood comprising dividing said wood into pieces suitable for treatment, subjecting said divided material to a delignifying action by chlorination, treating said material to remove products of said chlorination, and subsequently cooking said material with other digesting liquors to complete the delignification.

WALTER G. SCHARMANN.
FREDRICH OLSEN.